United States Patent [19]

Krüger

[11] Patent Number: 4,494,729
[45] Date of Patent: Jan. 22, 1985

[54] VALVE OPERATING MECHANISM, IN PARTICULAR FOR AN AUTOMOBILE INTERNAL COMBUSTION ENGINE

[75] Inventor: Hermann Krüger, Wolfsburg, Fed. Rep. of Germany

[73] Assignee: Volkswagenwerk Aktiengesellschaft, Wolfsburg, Fed. Rep. of Germany

[21] Appl. No.: 458,162

[22] Filed: Jan. 14, 1983

[30] Foreign Application Priority Data

Feb. 4, 1982 [DE] Fed. Rep. of Germany ....... 3203791

[51] Int. Cl.³ .............................................. F16K 31/44
[52] U.S. Cl. .................................... 251/229; 251/240; 251/337; 123/90.44; 123/90.6
[58] Field of Search ................. 123/90.44, 90.46, 90.6; 251/337, 240, 245, 229

[56] References Cited

U.S. PATENT DOCUMENTS

| | | | |
|---|---|---|---|
| 1,096,900 | 5/1914 | Fornaca | 123/90.6 |
| 2,506,566 | 5/1950 | Boyer | 123/90.44 |
| 2,521,176 | 9/1950 | Kutz | 123/90.44 |
| 3,795,229 | 3/1974 | Weber | 123/90.5 |
| 3,799,129 | 3/1974 | Cornell | 123/90.46 |
| 3,875,908 | 4/1975 | Ayres | 123/90.46 |
| 4,167,931 | 9/1979 | Iizuka | 123/90.6 |

FOREIGN PATENT DOCUMENTS

| | | |
|---|---|---|
| 2147033 | 3/1973 | Fed. Rep. of Germany . |
| 2819356 | 11/1979 | Fed. Rep. of Germany ... 123/90.48 |
| 622696 | 8/1961 | Italy ..................................... 251/337 |
| 55-69721 | 5/1980 | Japan .................................. 123/90.6 |
| 960396 | 6/1964 | United Kingdom . |

*Primary Examiner*—A. Michael Chambers
*Attorney, Agent, or Firm*—Brumbaugh, Graves, Donohue & Raymond

[57] ABSTRACT

A valve operating mechanism for an internal combustion engine for an automobile in which friction is decreased without an increase in the mass to be moved by the valve closing spring. The valve operating mechanism has a roller arranged on an actuation spindle. The roller cooperates with a bearing surface on a component of the mechanism that is connected to the valve, at least during valve opening, so that deviations of the valve lift curve from the desired valve lift curve are eliminated. Connection between the actuation spindle, through the roller, and the valve is maintained only during the valve-open cycle.

12 Claims, 4 Drawing Figures

VALVE OPERATING MECHANISM, IN PARTICULAR FOR AN AUTOMOBILE INTERNAL COMBUSTION ENGINE

BACKGROUND OF THE INVENTION

The present invention relates to a mechanism for operating valves in an internal combustion engine in an automobile.

In internal combustion engines, unless countermeasures are taken, a considerable portion of the driving power of the valve operating mechanism is lost due to friction between the actuation spindle of the mechanism, which is customarily a camshaft, and the component of the mechanism which rests against the actuation spindle, for example, a rocker arm, a drag lever, a tappet, or the end of a valve stem.

U.S. Pat. No. 3,795,229 and Great Britain Pat. No. 960,396 disclose arrangements wherein a roller is provided on a tappet or lever in order to decrease friction. A decrease in friction is attained in these arrangements, but there is a resulting disadvantage. Specifically, the mass to be moved by the valve spring during valve closing is increased by the mass of the roller. Therefore, stronger valve springs are necessary, and the size of the valve operating mechanism must be increased accordingly. Consequently, part of the gain in the driving power of the valve operating mechanism due to the decrease in friction that results because of the use of a roller is lost in work efficiency of the valve operating mechanism.

SUMMARY OF THE INVENTION

In a valve operating mechanism in accordance with the present invention, a gain in the driving power of the valve operating mechanism due to a decrease in friction, which results because of the use of a roller, is achieved without any increase in the mass to be moved by the valve spring. Therefore, the decrease in friction is achieved without any disadvantageous influence on the valve lift curve or a decrease in the flexibility of the valve operating mechanism, for example, flexibility in varying valve control times.

The present invention is a valve operating mechanism for an internal combustion engine in an automobile. More particularly, a valve operating mechanism in accordance with the present invention has a roller mounted on the actuation spindle of the mechanism, which could be a camshaft, a crankshaft or an eccentric shaft. The roller has a shape that is adjusted to the shape of the actuation spindle and is pivotably mounted by a roller bearing or a slide bearing on the actuation spindle. Contrary to typical arrangements, the roller is mounted on the actuation spindle, not on a component, e.g. a tappet or lever, located between the actuation spindle and the valve. Therefore, the roller does not increase the mass to be moved by the valve closing spring.

In known valve operating arrangements, the course of the valve lift over the actuation shaft angle or crankshaft angle, i.e., the valve lift curve, is constrained or restricted to essentially the cam shape. In a valve operating mechanism in accordance with the invention, the course of the contact point between the roller and a bearing surface on a valve actuation component, which may be a drag lever, a rocker arm, a tappet, or the end of a valve stem, is approximately sinusoidal. In order to obtain a more desirable valve lift curve, a correction to the approximately sinusoidal curve is made by shaping the bearing surface so that the valve operating mechanism as a unit generates the desired valve lift curve.

Faultless closing of the valve, even if the valve clearance varies, is ensured since the roller is connected with the valve only during the valve opening cycle. At other times, the roller body is not connected with the valve and performs an idle lift, possibly together with a tumbler or rocker lever. Although a valve operating mechanism in accordance with the invention is advantageous inasmuch as it facilitates the use of customary valve clearance equalization devices, such as a nonrotating cup tappet with a curved rolling path or means for hydraulic displacement of lever swivel points or contact surfaces, the bearing can be shaped to form a rolling-up ramp and a rolling-off ramp for valve clearance equalization. Alternatively, a shock absorber can be located between the valve actuation component and the valve and the bearing surface can be shaped to form a rolling-off ramp; the shock absorber cushions the rolling-up impact of the roller.

DE-PS No. 21 47 033 discloses a device wherein the cam of a camshaft is arranged within a valve operating mechanism in such a manner that when the valve is closed a gap is produced between the cam and a bearing surface, which is on a rocker arm or drag lever. The gap exists during the idle stroke of the cam. By appropriately designing ramps, the point of contact between the bearing surface and the cam can be adjusted for a desired valve clearance, for example, to allow longer operating times. However, in the arrangement disclosed the shape of the valve lift curve is determined by the shape of the cam surface, the cam being a component of the actuation spindle. Whereas in a valve operating mechanism in accordance with the invention, the shape of the valve lift curve is determined by a bearing surface located on a component of the valve operating mechanism between the actuation spindle and the valve.

Since a gap exists during the idle stroke, a valve operating mechanism in accordance with the invention may advantageously be provided with a spring to urge the drag lever or rocker arm against the valve so that the drag lever or rocker arm continuously contacts the valve in a force-transmitting manner.

An advantageous feature of the present invention is that conventional means for attaining variable valve control times can be employed in conjunction with the invention. If an eccentric shaft is used as the actuation spindle, the circular, disk-shaped eccentric regions can be swivelled relative to the axis of the spindle in order to vary valve control times. Alternatively, the valve control times may be varied by displacing components of the valve operating mechanism located between the roller and the valve, in a manner per se known. Lubrication of the bearings for the roller may be obtained by providing ducts in the actuation spindle.

In a preferred embodiment of the invention, the roller and the component having the bearing surface can be designed so that the roller rotates at times other than during the valve opening cycle, for example, by biasing the component having the bearing surface against the roller with a spring. Such a design further reduces friction since the roller does not have to be braked after each completion of the idle lift.

In a valve operating mechanism in accordance with the invention, the rollers can be guided axially by regions on the actuation spindle itself or by elements that are integral with the housing. If a subdivided crankshaft composed of several elements is used, nondivided rollers, including any optional roller or slide bearings, can be assembled when the crankshaft is assembled.

For a better understanding of the invention, reference is made to the following detailed description of the preferred embodiments taken in conjunction with the drawings accompanying the application.

DETAILED DESCRIPTION OF THE PREFERRED EMBODIMENTS

Figure 1:
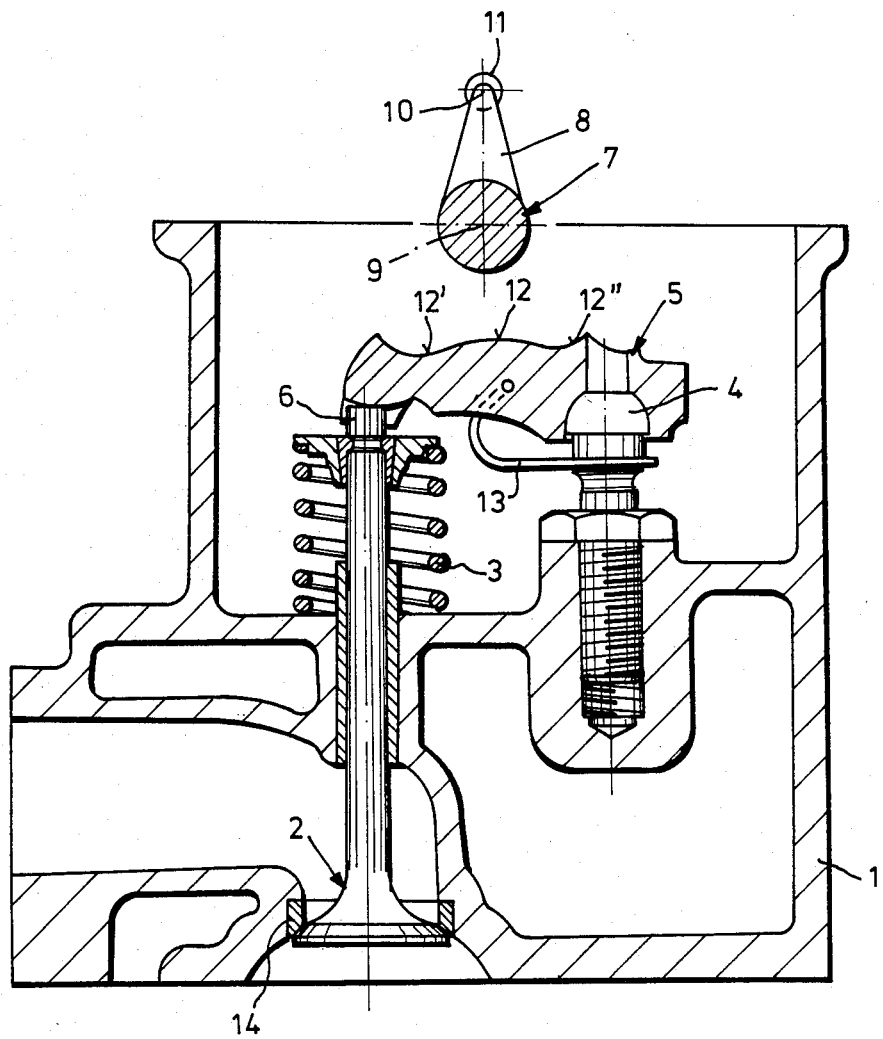
FIG. 1 is a vertical cross-sectional view of a valve operating mechanism in accordance with the invention with a drag lever, where the actuation spindle is a camshaft.

In FIG. 1, a cylinder head 1 of an automobile internal combustion engine, otherwise not shown, is provided with an inlet valve 2, which is urged in the upward direction into its closed position, which is shown, by a valve closing spring 3. A drag lever 5, which is pivotably mounted relative to the cylinder head at 4, is arranged to selectively transmit a downward force to a valve stem 6 to open the valve 2.

In order to generate such a downward force, a spindle 7, which is shown in FIG. 1 as a camshaft with cam-like arm 8, is provided. A roller 11 is supported and pivots around an axis 10 at the free end of the arm 8. The roller axis 10 is eccentric with respect to the axis 9 of the actuation spindle 7. The rollers are simple disk or cylinder-shaped rollers, which are lifted off a bearing surface 12 on the drag lever 5 when the valve 2 is in the closed position. A spring 13 constantly maintains the drag lever 5 in contact with the end of the valve stem 6.

When the shaft 7 pivots, the roller 11 comes into contact with the bearing surface 12. Bearing surface 12 of the roller 11 is shaped so that it converts the approximately sinusoidal lift movement of the roller 11 into the desired lift curve of the valve 2.

Figure 3:
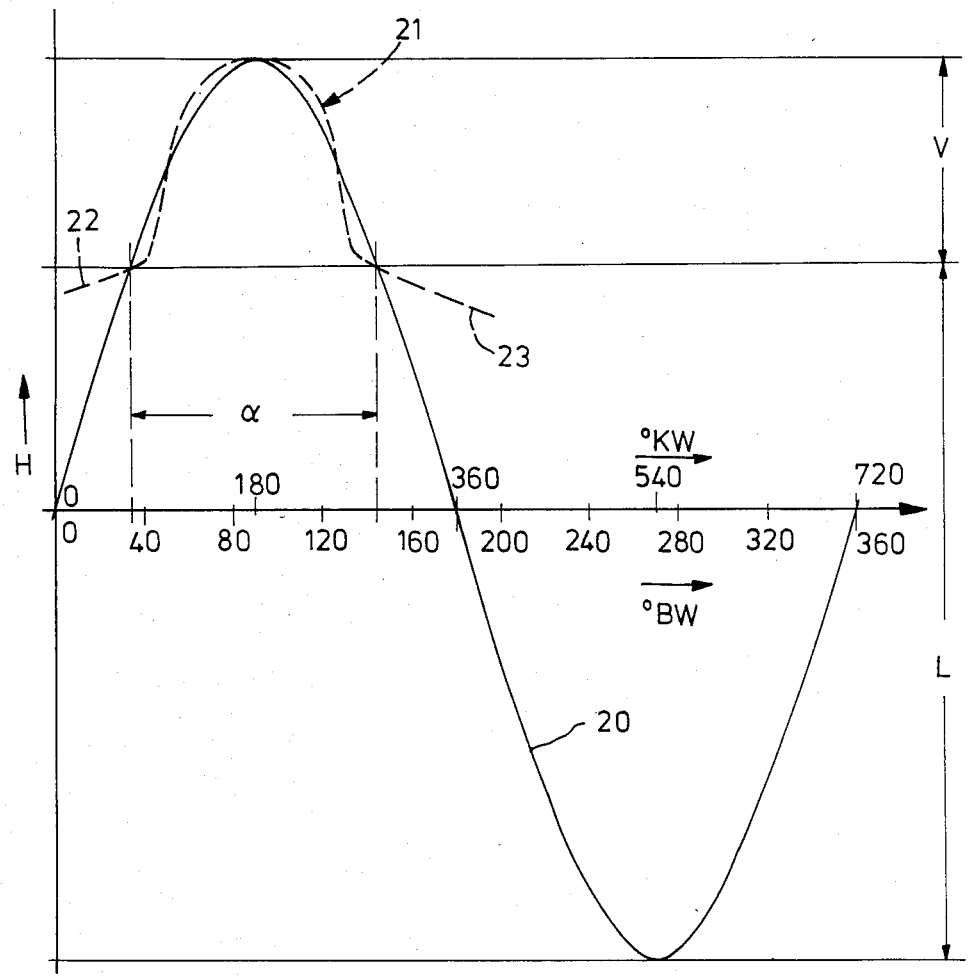
FIG. 3 is a graph showing valve lift and roller body lift versus angular displacement.

In FIG. 3, lift values, H, are plotted on the ordinate, and crankshaft angles, KW, of the crankshaft of the engine and actuation spindle angles, BW, are plotted in degrees on the abscissa. The reference numeral 20 designates the lift curve of the roller 11, and the reference numeral 21 designates the desired lift curve of the valve 2. The bearing surface 12 is shaped so that for each angular value, differences between the lift curve 20 of the roller 11 and the desired valve lift curve 21 are eliminated.

The curves in FIG. 3 show that the valve-open angle α extends only over a relatively small angular sector. Outside the valve-open angle α, the valve is closed. Outside the valve lift V, in which the valve is open, there is an idle lift L of the roller 11, in which the roller does not touch the bearing surface 12. As shown in FIG. 3 by the reference numerals 22 and 23 and in FIG. 1 by ramps 12' and 12", the bearing surface 12 has rolling-up and rolling-off ramps. Consequently, when the valve clearance is reduced through seating of the valve 2 in the valve seat 14, the points at which the roller 11 rolls on and off of the bearing surface 12 are displaced relative to the ramps 12' and 12", and changes in the valve clearance are automatically equalized.

Figure 2:
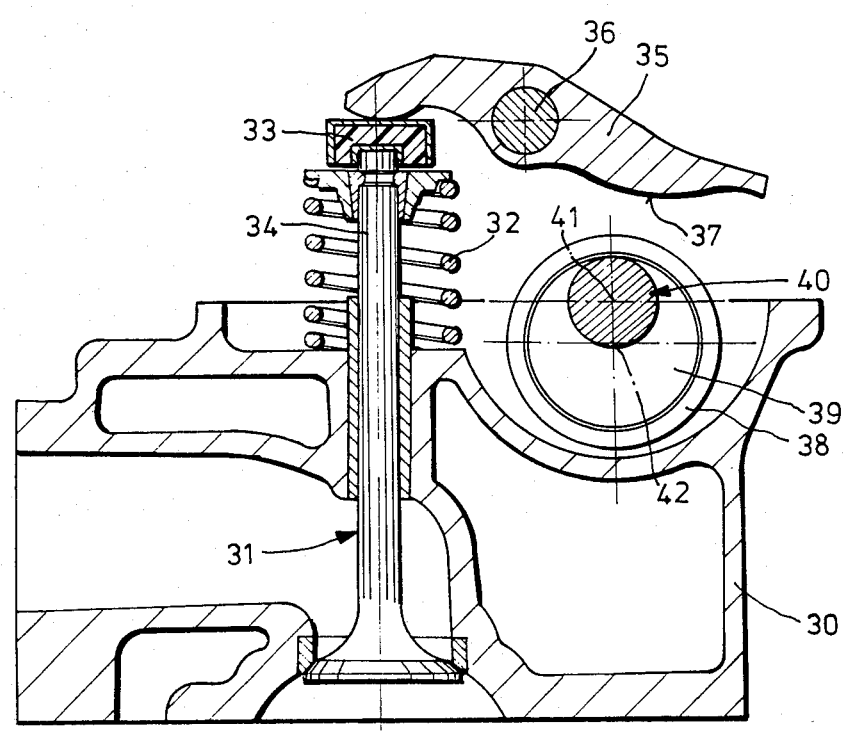
FIG. 2 is a vertical cross-sectional view of a valve operating mechanism in accordance with the invention with a rocker arm, where the actuation spindle is an eccentric shaft.

In FIG. 2, which illustrates another embodiment of the invention, a valve 31 with a valve closing spring 32 is arranged in a cylinder head 30. Valve opening force is transmitted to a valve stem 34 by a rocker arm 35 through a shock absorber 33, which is composed of a rubber-like material. The rocker arm 35, which pivots about shaft 36, carries a bearing surface 37, which has a shape similar to that of the bearing surface 12 in FIG. 1 and forms a rolling surface for a hollow-cylindrical or annular roller 38. The roller 38 rotatingly encloses a circular, disk-shaped eccentric region 39 of an eccentric shaft 40. FIG. 2 shows the offset between the axis 41 of the actuation spindle, which in this embodiment is the eccentric shaft 40, and the axis 42 of the eccentric region 39 and the roller 38.

Figure 4:
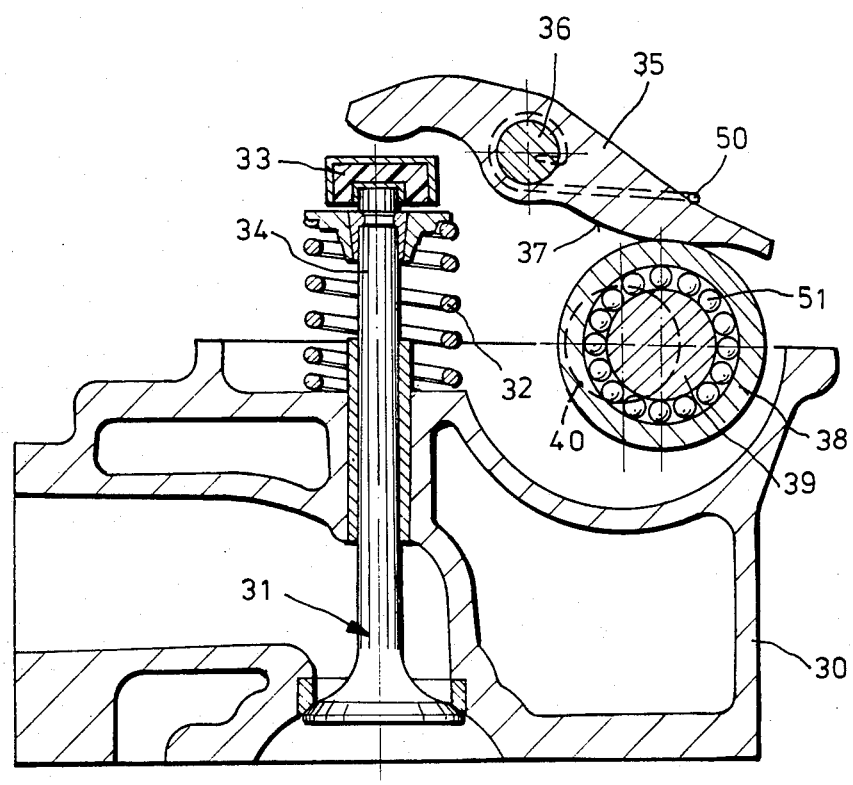
FIG. 4 is a vertical cross-sectional view of an embodiment a valve operating mechanism in accordance with the invention that is a modification of the embodiment shown in FIG. 2.

FIG. 4 illustrates a modified form of the embodiment of the invention shown in FIG. 2. The reference numerals used in FIG. 2 are, therefore, used again in FIG. 4. Outside the valve-open angle a separation occurs between the rocker arm 35 and a shock absorber 33, which is connected to the valve 31. A spring 50 continuously urges the rocker arm 35 against the roller 38. The roller 38 rests on the eccentric disk 39 by means of a roller bearing 51. As used herein, the term "roller bearing" means bearings with rolling elements, including ball bearings (which are depicted in FIG. 4). Because of the constant contact between the bearing surface 37 and the roller 38, the roller 38 does not rotate together with the actuation spindle 40 during the idle lift. Therefore, the roller 38 need not be braked first when the valve opening cycle begins.

In each of the embodiments of the invention shown in the figures, the roller does not increase the mass to be moved by the valve closing spring 3 or 32.

The above described embodiments of the invention are merely illustrative. Variations and modifications will be apparent to those skilled in the art without departing from the inventive concepts disclosed herein. For example, the camshaft 7 in FIG. 1 may instead be a crankshaft, the crankweb portions thereof being the equivalent of the cam elements 8. The rollers 11, mounted on cam elements 8 in FIG. 1, may be carried by crank pins connecting the crankwebs. All such variations and modifications are intended to be within the scope of the present invention as defined by the following claims.

I claim:

1. A valve operating mechanism for a valve preferably in an automobile internal combustion engine, comprising:

an actuation spindle rotatable about an axis;

a component coupled to the valve, at least during valve opening, in a force-transmitting manner, said component having a bearing surface;

cam means on said actuation spindle including roller means pivotable about an axis, said roller means axis being eccentric relative to the axis of said spindle, said roller means being arranged to engage said bearing surface for opening the valve, wherein said bearing surface forms a rolling surface for said roller means, said bearing surface being shaped to effect a desired valve-open cycle over a predetermined angle of spindle rotation and wherein a connection between said roller means and the valve is present only during said valve opening cycle; and spring means for restoring the value to its closed position, whereby the roller means is moed to its valve-closed position independently of the force applied to the valve by the spring means.

2. A valve operating mechanism according to claim 1 wherein said actuation spindle is a camshaft and said cam means includes at least one cam, said cam having a free end and carrying said roller means at said free end.

3. A valve operating mechansim according to claim 1 wherein said actuation spindle is a crankshaft having cam means in the form of a crank portion, said crank portion having regions for carrying said roller means.

4. A valve operating mechanism according to claim 1 wherein said actuation spindle is an ecentric shaft having cam means including circular, disk-shaped zones located eccentrically relative to said spindle axis, said roller means enclosing said circular, disk-shaped zones.

5. A valve operating mechanism according to claim 1 additionally comprising roller bearings for pivotably supporting said roller means.

6. A valve operating mechanism according to claim 1 additionally comprising slide bearings for pivotably supporting said roller means.

7. A valve operating mechanism according to claim 1 wherein said bearing surface includes a rolling-up ramp and a rolling-off ramp for valve clearance equalization.

8. A valve operating mechanism according to claim 1 additionally comprising shock absorber means for absorbing rolling-up impact of said roller means, said shock absorber means being located between said component connected to the valve and said valve and said bearing surface including a rolling-down ramp.

9. A valve operating mechanism according to claim 1 wherein said component connected to the valve is a drag lever continuously contacting said valve in a force-transmitting manner.

10. A valve operating mechanism according to claim 1 wherein said component connected to the valve is a rocker arm continuously contacting said valve in a force-transmitting manner.

11. A valve operating mechanism according to claim 1 wherein said roller means rotates at times other than during said valve-open cycle.

12. A valve operating mechanism according to claim 11 wherein said component connected to the valve is biased by a spring to continuously rest against said roller means.

* * * * *